(12) United States Patent
Desnoyer et al.

(10) Patent No.: US 12,554,737 B1
(45) Date of Patent: Feb. 17, 2026

(54) SYSTEMS AND METHODS FOR AUDIT MONITORING

(71) Applicant: The PNC Financial Services Group, Inc., Pittsburgh, PA (US)

(72) Inventors: Randy James Desnoyer, Avon, OH (US); Andrew Hinesman, Cleveland, OH (US); Kyle L. Hooks, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 18/817,572

(22) Filed: Aug. 28, 2024

Related U.S. Application Data

(60) Provisional application No. 63/639,471, filed on Apr. 26, 2024, provisional application No. 63/625,662, filed on Jan. 26, 2024.

(51) Int. Cl.
G06F 16/25 (2019.01)

(52) U.S. Cl.
CPC .............................. *G06F 16/254* (2019.01)

(58) Field of Classification Search
CPC .................................................. G06F 16/254
See application file for complete search history.

(56) References Cited

U.S. PATENT DOCUMENTS

| | | | | |
|---|---|---|---|---|
| 2008/0120240 | A1* | 5/2008 | Ginter | H04L 63/16 705/51 |
| 2010/0318858 | A1* | 12/2010 | Essawi | G06F 16/21 714/49 |
| 2020/0026710 | A1* | 1/2020 | Przada | G06N 20/00 |
| 2022/0027380 | A1* | 1/2022 | Martin | G06Q 40/08 |
| 2022/0286482 | A1* | 9/2022 | Barday | H04L 51/18 |
| 2025/0147935 | A1* | 5/2025 | Zhang | G06F 16/2358 |

OTHER PUBLICATIONS

Kevin Flerlage "14 Use Cases for Transparent Shapes & Images—The Flerlage Twins: Analytics, Data Visualization, and Tableau." Jul. 27, 2020, 24 pages.

* cited by examiner

*Primary Examiner* — Courtney Harmon
(74) *Attorney, Agent, or Firm* — Finnegan, Henderson, Farabow, Garrett & Dunner, LLP

(57) ABSTRACT

Systems, and methods for auditing are provided. The systems and methods may include receiving audit engagement information into a plurality of input databases. Thereafter, a subset of the engagement information may be identified and extracted into a data warehouse. The identified subset may be further extracted and collated via a Structed Query Language (SQL) unit resulting in a processed subset. At least one attribute may be applied to the processed subset and thereafter a report may be generated via an interactive interface. The interactive interface allows for a user to be alerted of a possible exception or data anomaly prior to an exception being officially recorded. Thus, the auditing system described herein provides reporting and management of the auditing system.

20 Claims, 14 Drawing Sheets

```
select distinct
y.ActiveAuditPlanTitle as AUDIT_PLAN
, y.ProjectID as PROJECT_ID
, y.ProjectCode as ENGAGEMENT_CODE
, y.ProjectTitle as ENGAGEMENT_NAME
, a.ControlId as CONTROL_ID
, a.ControlTitle as CONTROL_TITLE
, b.originalid as HISTORICAL_ID
, b.VersionDate as HISTORICAL_DATE
, d.FirstName as HISTORICAL_FNAME
, d.LastName as HISTORICAL_LNAME
, d.LoginName as PID
, case when b.AdditionalChangeText is null
    then c.StringResourceValue
    else concat(c.StringResourceValue ,': ', b.AdditionalChangeText)
  end as Action_History
```

| AUDIT_PLAN | PROJECT_ID | ENAGEMENT_CODE | ENAGEMENT_NAME | CONTROL_ID | CONTROL_TITLE | HISTORICAL_ID | HISTORICAL_DATE | HISTORICAL_FNAME | HISTORICAL_LNAME | PID | Action History |
|---|---|---|---|---|---|---|---|---|---|---|---|
| 2023 Audit Plan | 1144 | 265 | Credit Card Operations Servicing and Change Deliver | 12345 | 21030752 – Credit Line Adjustment Review (QA) | 2264738 | 22:05:2 | Jane1 | Doe1 | PP78780 | Created |
| 2023 Audit Plan | 1144 | 265 | Credit Card Operations Servicing and Change Deliver | 12345 | 21030752 – Credit Line Adjustment Review (QA) | 2265386 | 24:25.6 | Jane2 | Doe2 | PP78780 | Edited |
| 2023 Audit Plan | 1144 | 265 | Credit Card Operations Servicing and Change Deliver | 12345 | 21030752 – Credit Line Adjustment Review (QA) | 2299072 | 17:28.2 | Jane3 | Doe3 | PP78780 | Edited |
| 2023 Audit Plan | 1144 | 265 | Credit Card Operations Servicing and Change Deliver | 12345 | 21030752 – Credit Line Adjustment Review (QA) | 2497610 | 41:33.4 | Jane1 | Doe1 | PP78780 | Edited |
| 2023 Audit Plan | 1144 | 265 | Credit Card Operations Servicing and Change Deliver | 12345 | 21030752 – Credit Line Adjustment Review (QA) | 2497612 | 41:45.7 | Jane2 | Doe2 | PP78780 | Edited |
| 2023 Audit Plan | 1144 | 265 | Credit Card Operations Servicing and Change Deliver | 12345 | 21030752 – Credit Line Adjustment Review (QA) | 2497671 | 47:49.4 | Jane3 | Doe3 | PP78780 | Link Created |
| 2023 Audit Plan | 1144 | 265 | Credit Card Operations Servicing and Change Deliver | 12345 | 21030752 – Credit Line Adjustment Review (QA) | 2498346 | 39:11.0 | Jane1 | Doe1 | PP78780 | Edited |
| 2023 Audit Plan | 1144 | 265 | Credit Card Operations Servicing and Change Deliver | 12345 | 21030752 – Credit Line Adjustment Review (QA) | 2498440 | 00:43.0 | Jane2 | Doe2 | PP78780 | Edited |

FIG. 2D

```
--AF1: Risk, Control, and CET/SAP objects are approved by the Audit Manager or higher
select distinct
eng_info.*
, risk.obj_id
, 'Risk' object_category
, risk.object_title
, risk_max_id.action_history
, risk_max_id.historical_date
, risk_max_id.historical_fname
, risk_max_id.historical_lname
, risk_max_id.full_name
, risk_max_id.pid
, risk_max_id.join_date
, S.A.resource_name
, S.A.dept_title
, 'AF1' attribute_test
, 'fieldwork' test_phase
, case when eng_info.project_type not in ('Standard Audit', 'Targeted Audit', 'Project Audit', 'Consultative Services',
  'Regulatory Issue Validation', 'Issue Validation','Continuous Monitoring', 'Special Project') then 'N/A'
    when risk.obj_id is null then 'No test performed'
    when risk_max_id.pid is null then 'No approvals found'
    when In.D.career_level_mapped >= 3 then 'Pass'
    when In. D.career_level_mapped < 3 then 'Audit Manager Approval or Higher Needed'
    else null
    end test_result
FROM eng_info
```

◉ View: Original

Lead AGA
- ◉ Jane Doe 1
- ○ John Doe 1
- ○ Jane Doe 2
- ○ John Doe 2
- ○ Jane Doe 3
- ○ John Doe 3
- ○ Jane Doe 4
- ○ John Doe 4
- ○ Jane Doe 5
- ○ John Doe 5

Lead Director
Janet Doe 1 ▶

Project Type
(All) ▶

Engagement Status
(All) ▶

Start Date (Monthly)
(All) ▶

Exclude Not Started
- ◉ Yes
- ○ No

A · B · C · D · E

⊘ Data Guide    ⊚ Watch ▼

Audit Engagement Quality Monitoring
8/31/2023

Test Category
- ◉ Planning
- ○ Fieldwork
- ○ Reporting
- ○ Wrap Up

Planning Overview*
*Counts represent distinct engagements

| Engagement Name | Current Audit Status | Alerts (1) | Exceptions (6) | Pass (6) | No Approvals (3) | No Object (1) |
|---|---|---|---|---|---|---|
| 2023-FI-Project-1 | Closed | | | | | |
| 2023-FI-Project-2 | Closed | | ✖ | ✓ | | |
| 2023-FI-Project-3 | Engagement Planning and Scoping | ⚠ | ✖ | ✓ | ✎ | |
| 2023-FI-Project-4 | Fieldwork | | ✖ | ✓ | | |
| 2023-FI-Project-5 | Closed | | | | | |
| 2023-FI-Project-6 | Field Work | | ✖ | ✓ | | |
| 2023-FI-Project-7 | Field Work | | ✖ | | | |
| 2023-FI-Project-8 | Field Work | | | | | |
| 2023-FI-Project-9 | Engagement Planning and Scoping | | ✖ | ✓ | ✎ | |
| 2023-FI-Project-10 | Engagement Planning and Scoping | ⚠ | | ✓ | ✎ | |

FIG. 5

Engagement Summary

| Test Name | Test Description | Obj Category | Obj Category | Obj Category | Obj Status | Date Approved | Approver | Approver Title | |
|---|---|---|---|---|---|---|---|---|---|
| Audit Manager Procedures | Audit Notification Communication, Engagement Planning Meetings, and SAS99 objects are approved by an Audit Manager or higher. | Audit Notification Communication | Audit Notification Communication | | Reviewed-Approved | 3/8/2023 1:42:49 PM | Jane Doe 1 | Internal Audit Mgr Sr | Pass |
| | | Engagement Planning Meetings | Engagement Planning Meetings | | Reviewed-Approved | 3/21/2023 12:23:54 PM | Jane Doe 1 | Internal Audit Mgr Sr | Pass |
| | | SAS 99 | Fraud (SAS99) Assessment | | Reviewed-Approved | 4/10/2023 1:08:32 PM | Jane Doe 1 | Internal Audit Mgr Sr | Pass |
| Lead AGA Scope | Final Engagement Scope and Memo object is approved by the Lead AGA. | Final Engagement Scope | Final Engagement Scope and Memo | | Reviewed-Approved | 4/12/2023 2:34:16 PM | John Doe | Asst Gen Author | Pass |
| Lead Director Procedures | Engagement Independence Attestation, Engagement Planning and Scoping Document, and PRACM are approved by the Lead Director or Lead AGA. | Engagement Planning and Scoping | Engagement Planning and Scoping Document | | Reviewed-Approved | 4/3/2023 2:16:51 PM | Jane Doe 2 | Internal Audit Director | Pass |
| | | Independence | Engagement Independence Attestation | | Reviewed-Approved | 3/24/2023 5:16:50 PM | Jane Doe 2 | Internal Audit Director | Pass |
| | | Preliminary Risk and Control Matrix (PRACM) | Preliminary Risk and Control Matrix (PRACM) | | Reviewed-Approved | 4/4/2023 1:57:37 PM | Jane Doe 2 | Internal Audit Director | Pass |
| Procedures Prior to Scope | Audit Notification Communication, Engagement Planning Meetings, and PRACM are fully approved prior to or same day of Lead AGA approval of the Final Engagement Scope and M... | Final Engagement Scope | Final Engagement Scope and Memo | | Reviewed-Approved | 4/12/2023 2:34:16 PM | John Doe | Asst Gen Author | Pass |
| SAM Procedures | Issues Previously Identified are approved by a Senior Audit Manager or higher. | Issues Previously Identified | Issues Previously Identified | | Reviewed-Approved | 4/17/2023 2:51:07 PM | Jane Doe 1 | Internal Audit Mgr Sr | Pass |

FIG. 6

SYSTEMS AND METHODS FOR AUDIT MONITORING

CROSS REFERENCES TO RELATED APPLICATIONS

This application claims the benefit of priority of U.S. Provisional Application No. 63/625,662, filed Jan. 26, 2024, and U.S. Provisional Patent Application No. 63/639,471, filed Apr. 26, 2024. The foregoing applications are incorporated herein by reference in their entirety.

TECHNICAL FIELD

The present disclosure relates generally to systems and methods for audit monitoring. More specifically, the present disclosure relates to the retrieval, storage and processing of audit related data to efficiently manage audit engagements. The present disclosure further relates to providing an interactive visual tool for audit management.

BACKGROUND

Institutional audits may evaluate a company's internal controls, governance and accounting processes. Audits are used to evaluate risk management practices, internal control systems, and compliance with corporate policies, for example, concerning IT-related risks at institutions of every size and complexity. Audit technology supports audit programs, which evaluate such practices and systems.

Effective audit programs promote sound controls, ensure timely resolution of audit deficiencies, and inform the board of directors of the effectiveness of risk management practices. An effective audit function may also reduce the time regulatory examiners spend reviewing the institution or may effectively assist regulatory examiners in performing their reviews.

Accordingly, an auditor must plan, manage, and monitor rapidly changing technologies to deliver and support new products, services, and delivery channels, because the rate of these changes and the resulting increased reliance on technology make the inclusion of audit coverage an integral aspect to an effective overall audit program.

SUMMARY

Current auditing systems often require information from different systems where data may have various types of formatting. A need exists to obtain an auditing system capable of retrieving and using data from different sources and formats, where changes and analysis may be made efficiently. The present solution utilizes a centralized system with auditing technology enabling an interactive auditing process where real-time adjustments may be made.

In some embodiments, systems, and methods for auditing are provided. The systems and methods may include receiving engagement information into a plurality of input databases. Thereafter, a subset of the engagement information may be identified and extracted into a data warehouse. The identified subset may be further extracted and collated via a Structed Query Language (SQL) unit resulting in a processed subset. At least one attribute may be applied to the processed subset and thereafter a report may be generated via an interactive interface.

In some embodiments, the engagement information may include engagement records, user information, system history logs, user status, reporting hierarchy, user personnel information, and/or group personnel information.

In some embodiments, the processing logic unit includes a Structured Query Language (SQL) database.

In some embodiments, the extracting and collating further includes organizing the engagement information for efficient processing.

In some embodiments, the generating further includes generating an alert of a potential exception or data anomaly prior to a recording of the exception.

Some embodiments further include receiving a user input to modify the data or at least one attribute.

In some embodiments, one or more devices that are configured or operable to perform the above-described systems and methods are disclosed.

The above and other aspects and their implementations are described in greater detail in the drawings, the descriptions, and the claims.

BRIEF DESCRIPTION OF FIGURES

FIG. 2C is an illustrative example of the data transformation/translation provided by the audit data warehouse, consistent with disclosed embodiments.

FIG. 2D is an illustrative example output of the data transformation/translation of FIG. 2C, consistent with disclosed embodiments.

FIG. 4C is an illustrative example of programming statements, consistent with disclosed embodiments.

FIG. 5 is a schematic diagram of an interactive interface displaying an auditing report, consistent with disclosed embodiments.

FIG. 6 is a schematic diagram of a hover pop-up menu of the interactive interface, consistent with disclosed embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

Figure 1A:
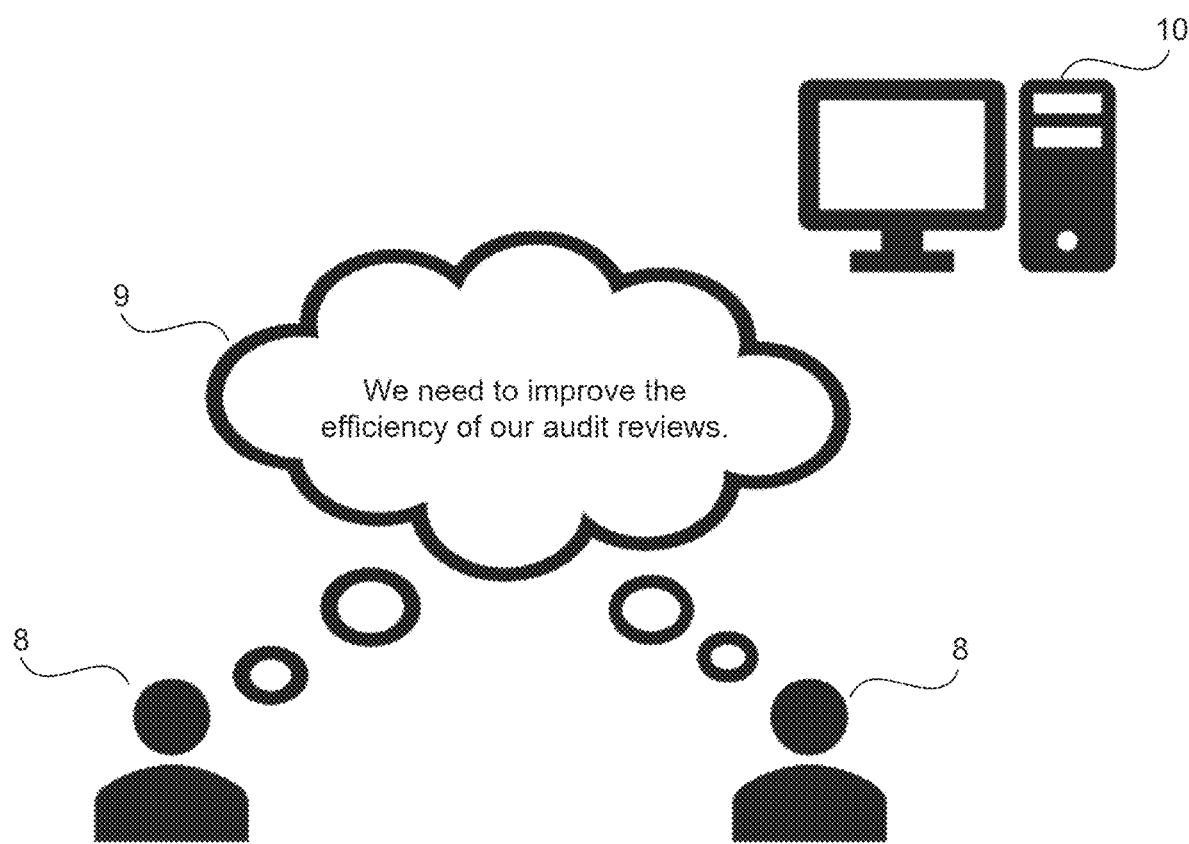
FIG. 1A is a schematic diagram of members of an institution expressing their desire to improve auditing technology, consistent with disclosed embodiments.

Audits are used to evaluate risk management practices, internal control systems, and compliance with corporate policies. FIG. 1A is a schematic diagram of employees of a company expressing a desire to review internal processes, policies, and control systems consistent with disclosed embodiments. FIG. 1A illustrates corporate directors 8 expressing a desire 9 to review such internal processes with the use of an auditing system 10 in an efficient and effective manner. During an auditing process, many different forms of data may be used for evaluation purposes. The data may come from different sources and may be in different formats. Thus, a need exists for ensuring different forms of data may be used through an auditing system. Furthermore, during the auditing process, a need may arise for amending data or a manner in which the auditing process is evaluated. Thus, a need also exists for a means to allow a user or auditor to make such modifications while the audit is in process and in a timely manner.

Figure 1B:
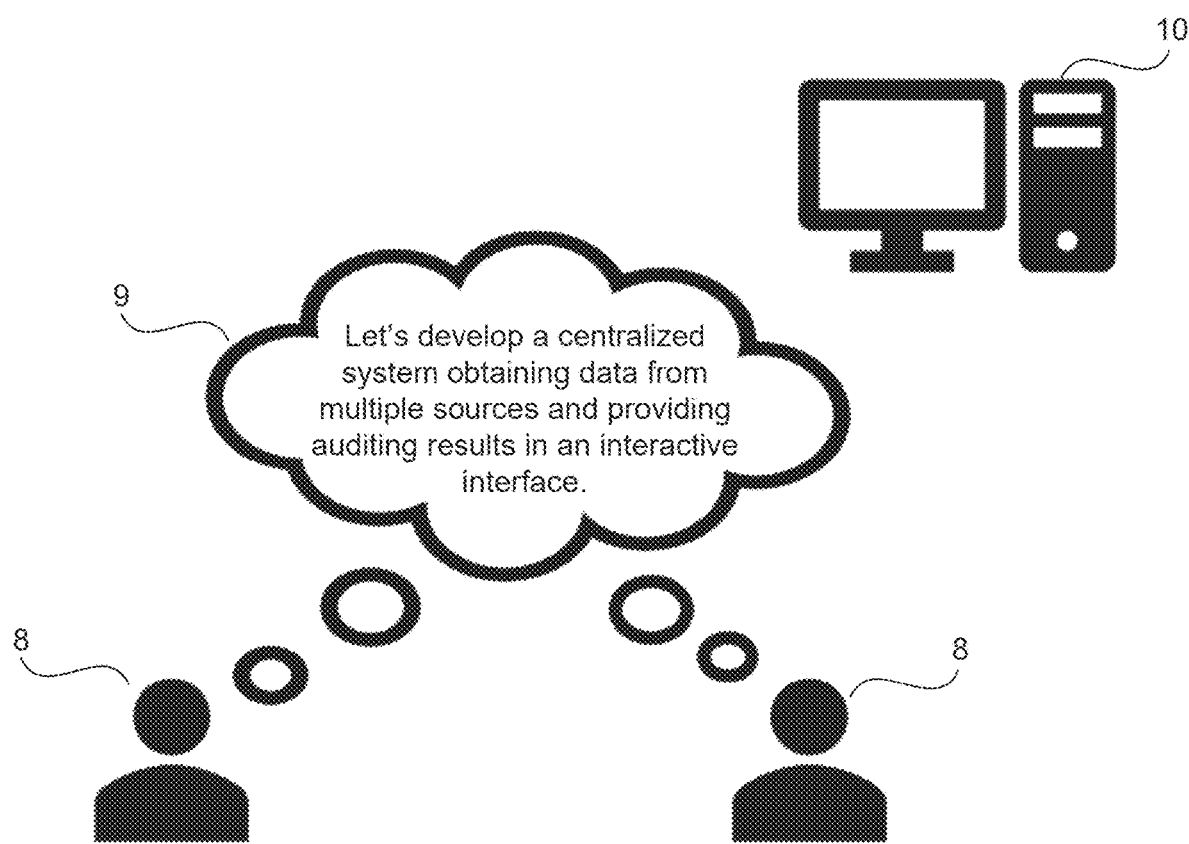
FIG. 1B is a schematic diagram of members of an institution developing a solution for improving auditing technology, consistent with disclosed embodiments.

FIG. 1B is a schematic diagram of the employees featured in FIG. 1A developing a solution for efficient and effective auditing of internal processes, policies and control systems consistent with disclosed embodiments. Specifically, a centralized system which may obtain data from multiple different sources and provide auditing results with the use of an interactive user interface allowing a user to make modifications to data or the auditing process is presented.

Figure 2A:
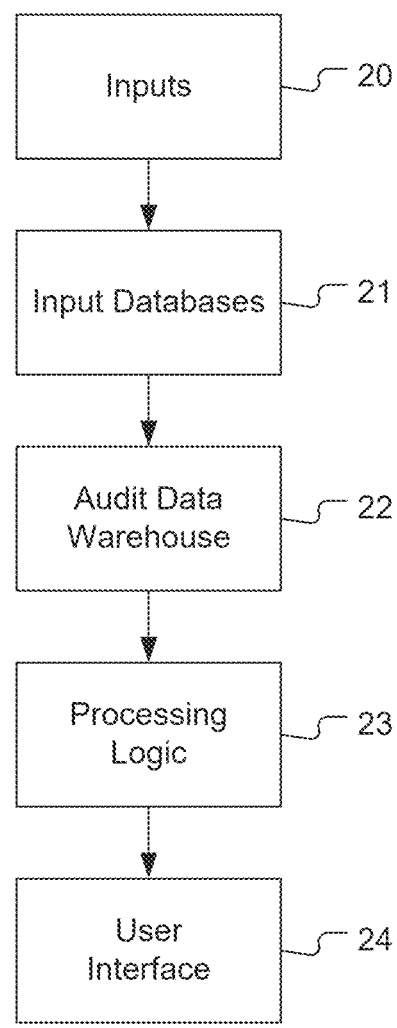
FIG. 2A is a schematic block diagram of various components of the auditing system, consistent with disclosed embodiments.

FIG. 2A is a schematic diagram providing an overview of different components of the auditing system, consistent with disclosed embodiments. In operation, input data 20 is introduced into the auditing system. Input data may be in the form of audit specific data such as audit workpapers, audit engagement records and all user changes to such engagement records. Audit workpapers are used to document the information gathered during an audit and provide evidence that sufficient information was obtained by an auditor to support their findings.

Audit engagement records, also known as audit documentation, are documents that include information about an audit engagement. An audit engagement is an agreement between an entity to be audited and an auditor for the auditor to review, for example, financial statements, accounting records or internal controls. User changes to the engagement records may include a user identification and date of the change. User change data may also include information from a system history log, which may include a recording or any updates or changes to the auditing system or related components. Audit related data may be input into the auditing system, for example, manually via text fields, drop-down selection menus or remote buttons. According to some example embodiments, the auditing system may also include templates for auditor use. Such templates may include pre-populated fields and selections.

Input data 20 may also include staff or group related data. The staff or group related data may be provided for each employee of the company. The staff data may also include an employee status, for example, the data may indicate if the employee has been terminated or transferred. The staff data may further indicate a reporting hierarchy, for example, an identification of a direct manager, employee title, associated audit team, and the like. Staff or group related data may also be sourced from human resource documentation.

The input data 20 may be placed in input databases 21. The input database 21 may function as a centralized master repository for the data used in auditing processes. Any number of input databases may be employed. According to some of the example embodiments, different input databases may be dedicated to different forms of input data. For example, an input database may be dedicated to user or group personnel information, while another input database may be dedicated to audit workpapers.

FIG. 2A further illustrates an audit data warehouse 22 that may be configured to extract data related to an audit from the input databases 21 for further processing. A data warehouse 22 may be a database system used for the analysis of structured data from multiple sources. The audit data warehouse 22 may aggregate the data from the input databases 21 to allow for efficient processing and data analysis of the auditing system. According to some of the example embodiments, the data warehouse 22 may identify subset data associated with an audit to be processed. The identified subset data may be extracted from the input databases.

According to some of the example embodiments, data may be identified as belonging to the subset based on an object type associated with the data. Object types may include risk, control procedures, or supporting documents. The object type may be tagged or included with the data stored in the input databases. Therefore, based on the specific audit being evaluated, data associated with a specific object type may be extracted and included in the identified data subset.

It should be appreciated data naming systems may vary among different input databases, the data warehouse and further components of the auditing system. Therefore, the collation of the data may involve the renaming of data to provide consistency throughout the auditing system. Such renaming is further described in relation to at least FIGS. 2B-2D.

Upon collation, the identified subset of data is processed by processing logic 23 (also known as business intelligence software). Specifically, in the processing logic 23, a set of logic, which is based on at least one attribute test, is applied to the extracted data resulting in an output data source. An attribute test is an analysis on the identified subset data to assess whether a project or process under review in the audit meets predefined standards. The attribute testing will be further described in relation to at least FIGS. 2E and 4C.

The output data source is thereafter provided to a user via an interactive user interface 24. The interface 24 may display the results of the auditing process. The displayed results may include a listing of passes, acceptations and potential exceptions detected in each auditing process. The interface 24 allows for user interaction such that if a potential exception is detected, an auditor may be able to view and alter data and/or attribute tests before the exception is officially recorded.

Figure 2B:
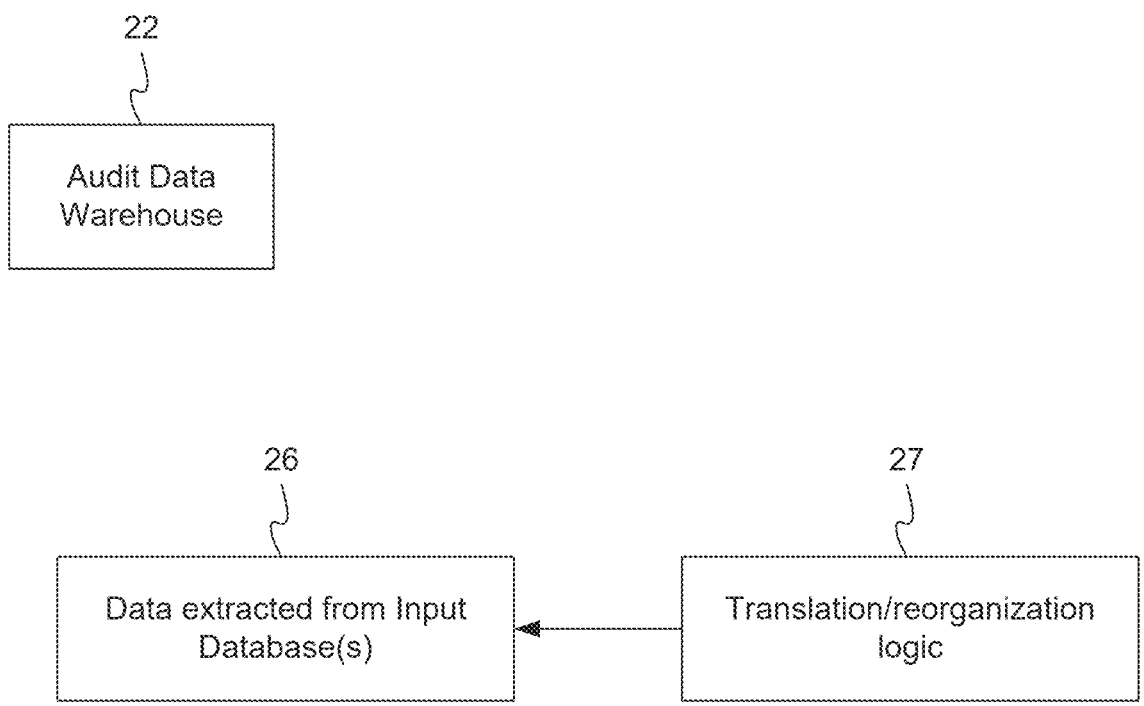
FIG. 2B is a schematic block diagram depicting the functionality of the audit data warehouse, consistent with disclosed embodiments.

FIG. 2B is a schematic diagram of the audit data warehouse 22. According to some of the example embodiments, the audit data warehouse 22 may be configured to extract data 26 from the input databases 21 and apply a translation/transformation and/or reorganization logic 27 to the extracted data. Specifically, the data stored in the input databases 21 may take a different form or use a different naming system than that applied by the processing logic 23. Therefore, the data transformation/translation provided by the audit data warehouse allows the auditing system to utilize input databases 21 from different systems utilizing any type of data format or naming system.

According to some of the example embodiments, the translation/transformation performed by the logic 27 involves renaming, reformatting or creating new fields if required. The creation of new fields may be determined based on an aggregation or calculations of existing fields from the input databases. According to some embodiments, the data warehouse and the business intelligence share knowledge of the naming and formatting conventions used by each. With this knowledge, the logic 27 may perform the required operations to ensure the extracted data is in the proper format for later processing.

FIG. 2C is an illustrative example of the data transformation/translation provided by the audit data warehouse 22, consistent with disclosed embodiments. In the example provided by FIG. 2C, the audit data warehouse 22 extracts control history related data (illustrated in the lefthand side of box 40) and reassigns the name and format of the data to one that is recognized by the processing logic 23 (illustrated on the righthand side of box 40), where the reassignment is provided with an 'as' operation. Box 41 is another example of a transformation/translation featuring a calculation within a Structured Query Language (SQL) database resulting in another field where the original input database field name (e.g., 'AdditionalChangeText' and 'StringResource Value') are aliased to be called 'Action_History'.

The data warehouse 22 may have knowledge of the name and format utilized by the processing logic 23. Furthermore, the data warehouse may also have knowledge of an ordering of such analysis or attribute tests that are to be performed. For example, an audit may be designed to analyze all users associated with a project and thereafter analyze project dates and statuses. In such an instance, all data associated with a user identification may be presented first and thereafter data related to dates and statuses may be provided. With this knowledge, the data warehouse 22 may rename and organize the data to be analyzed to allow for efficient processing.

FIG. 2D illustrates an example output of the operations provided in FIG. 2C. The data of FIG. 2D is arranged in a number of columns such as 'Audit Plan', 'Project ID', 'Engagement Code', 'Engagement Name', 'Control ID', 'Control Title', 'Historical ID', 'Historical Date', 'Historical FNAME', 'Historical LNAME' 'PID', and 'Action History'. The columns provide an example of the different types of data that may be employed in the audit. The data may be related to identifying information related to an audit or engagement as well as people associated with the same. The displayed data also provides an indication of a status via the action history. What should be appreciated from FIG. 2D is data extracted from the input databases are provided in a format and naming system known by the audit system. Upon the transformation/translation, that data is in the proper format and naming scheme to be utilized by the auditing system for review and analysis.

Figure 2E:
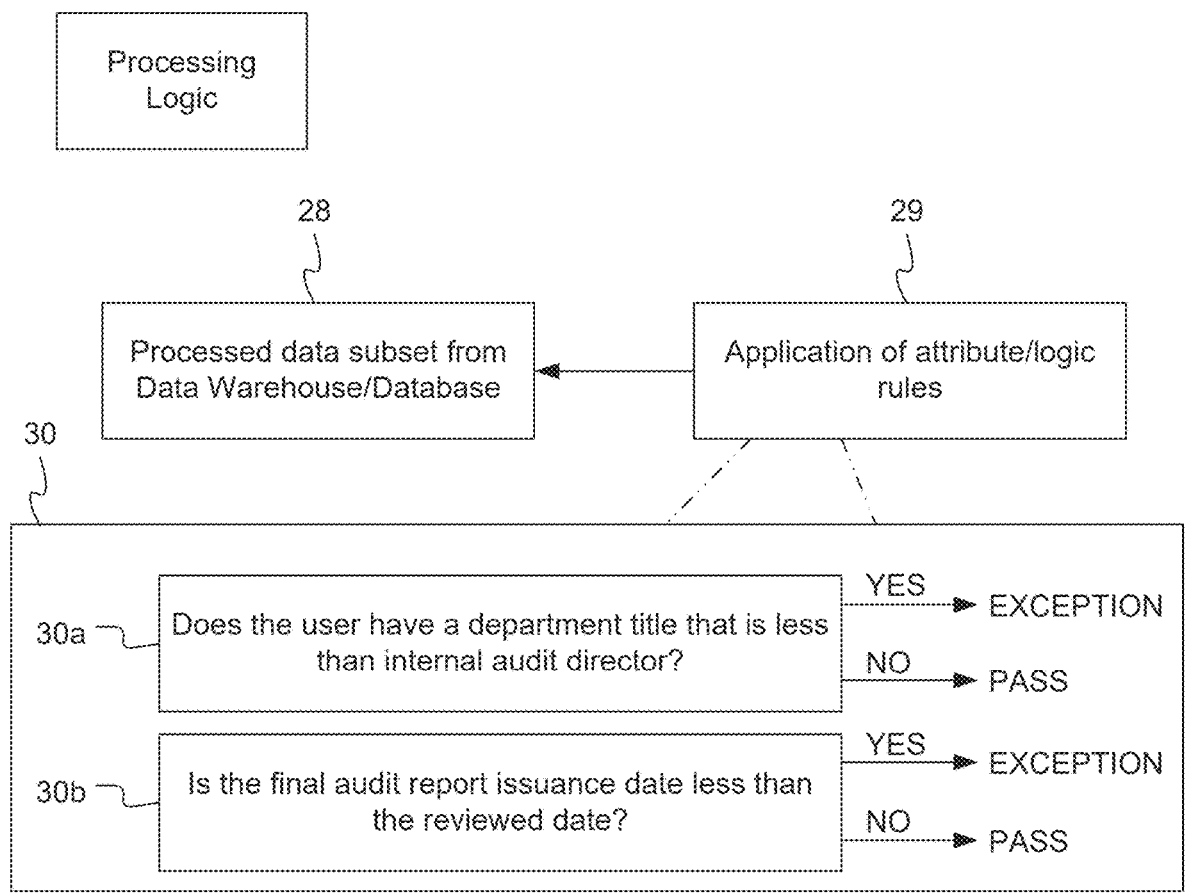
FIG. 2E is a schematic block diagram depicting the functionality of the processing logic, consistent with disclosed embodiments.

FIG. 2E is a schematic diagram of processing logic 23. The processing logic 23 may access data processed 28 via the transformation/translation and/or reorganization as described in relation to FIG. 2C. An application of attributes or logic rules 29 is thereafter applied to the processed data.

Examples 30 of such attributes or logic rules are provided in FIG. 2E. An attribute determining if a specific user has a department title of less than internal audit director 30a may be applied. Such an attribute may determine if a user associated with a specific audit query has a sufficient level of authority. If the query result of the attribute 30a is 'YES,' a potential exception is flagged or alerted to the user of the auditor system. If the query result of the attribute is 'NO,' a pass may be displayed to the user of the auditor system.

A further attribute may determine if a final audit report issuance date is less than a reviewed date 30b. Such an attribute may determine if a review date of an associated audit is past an acceptable date for such review. If the query result of the attribute 30a is 'YES,' a potential exception may be flagged or alerted to the user of the auditor system. If the query result of the attribute is 'NO,' a pass may be displayed to the user of the auditor system. Additional example attributes may include determining if an action item comprises a threshold date such that an analysis has been made or an object has been reviewed in a timely manner. It should be appreciated the attributes illustrated in FIG. 2E are merely examples and other forms of attributes may be employed.

Figure 3:
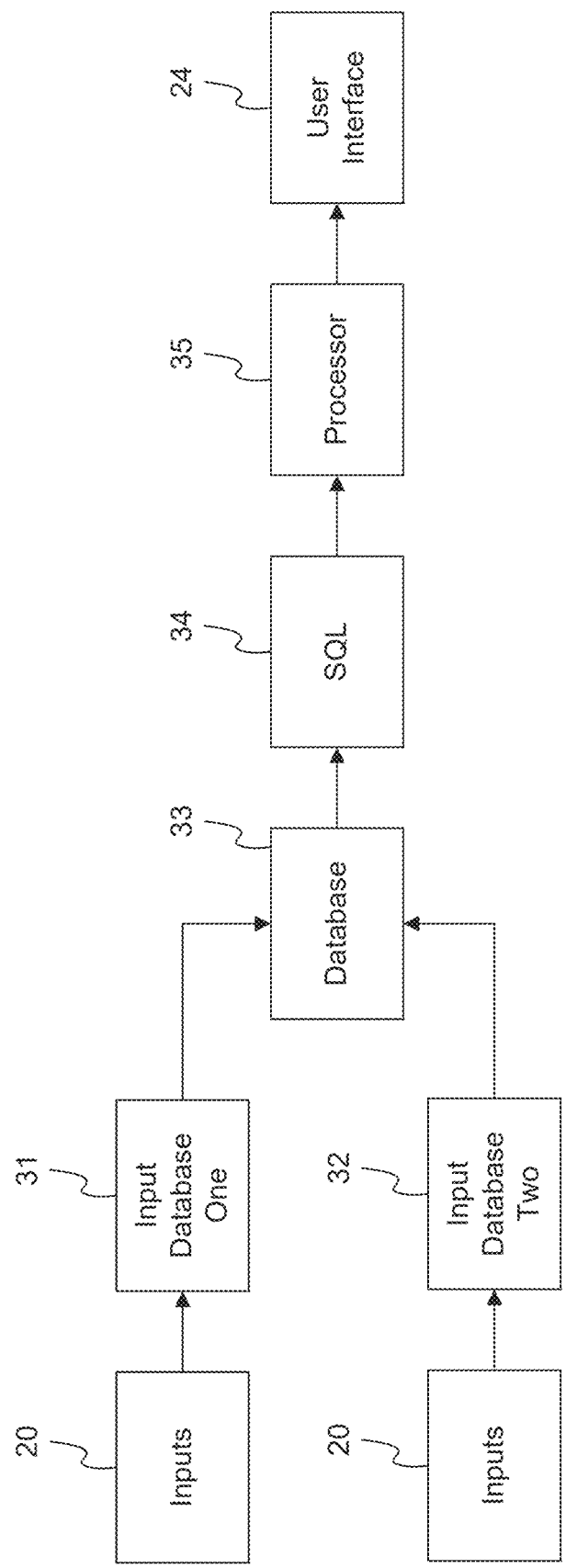
FIG. 3 is a schematic block diagram of various components of the auditing system, consistent with disclosed embodiments.

FIG. 3 is a schematic diagram of the different components of the auditing system, consistent with disclosed embodiments. FIG. 3 illustrates many of the same components, referenced with the same numerals, as shown in FIG. 2A. As shown in FIG. 3, a plurality of inputs 20 from any number of databases may be provided into the audit system. In FIG. 3, input databases 21 of FIGS. 2A-2D, are illustrated as input database one 31 and input database two 32. In the illustrative example of FIG. 3, input database one 31 is an input database dedicated to audit engagement information and an input database two 32 is dedicated to user and/group personnel information. The audit engagement information may include information related to personnel assigned to different audits, project types, engagement status, engagement start date, etc. The user and group personnel information may include personnel information related to title, authorization and access abilities, etc. It should be appreciated any number of input databases may be employed. According to some of the example embodiments, data may be manually entered into the database.

In FIG. 3, a database 33 may be used as a data warehouse and the business information software, or processing logic) is in the form of a Structed Query Language (SQL) database 34 and a processor 35. SQL is a programming language used to manage and manipulate data in relational databases, such that SQL database 34 is a relational database using SQL. In operation, data is extracted from the database 33, as described in relation to FIGS. 2B-2D, and processed within the SQL database 34. A collection of SQL scripts may be coalesced together in the processor 35 to apply a set of logic based on at least one attribute test, as described in relation to FIG. 2E. The data and result of the at least one attribute test is thereafter provided as output via the user interface 24, which may be displayed on a computer or any other form of user device.

According to some of the example embodiments, the SQL database 34 uses SQL on data already transformed (e.g., by logic 27 as illustrated in FIG. 2B), and returning an appropriate value based on the outcome of a logical test. Finally, a processor uses the SQL from the previous step to create a visual representation of the data and results that a user can see visually and may further interact with (e.g., by adjusting filters and exporting data, etc.).

It should be appreciated, in FIG. 3, while the SQL database 34, the processor 35 and the user interface 24 are illustrated as being included in a same computing system 36, any other configuration may be employed. For example, the input databases 31 and 32 and the database 33 may be provided in the computing system 36 or remotely. Furthermore, the user interface 24 may also be remote from the computing system 36.

Figure 4A:
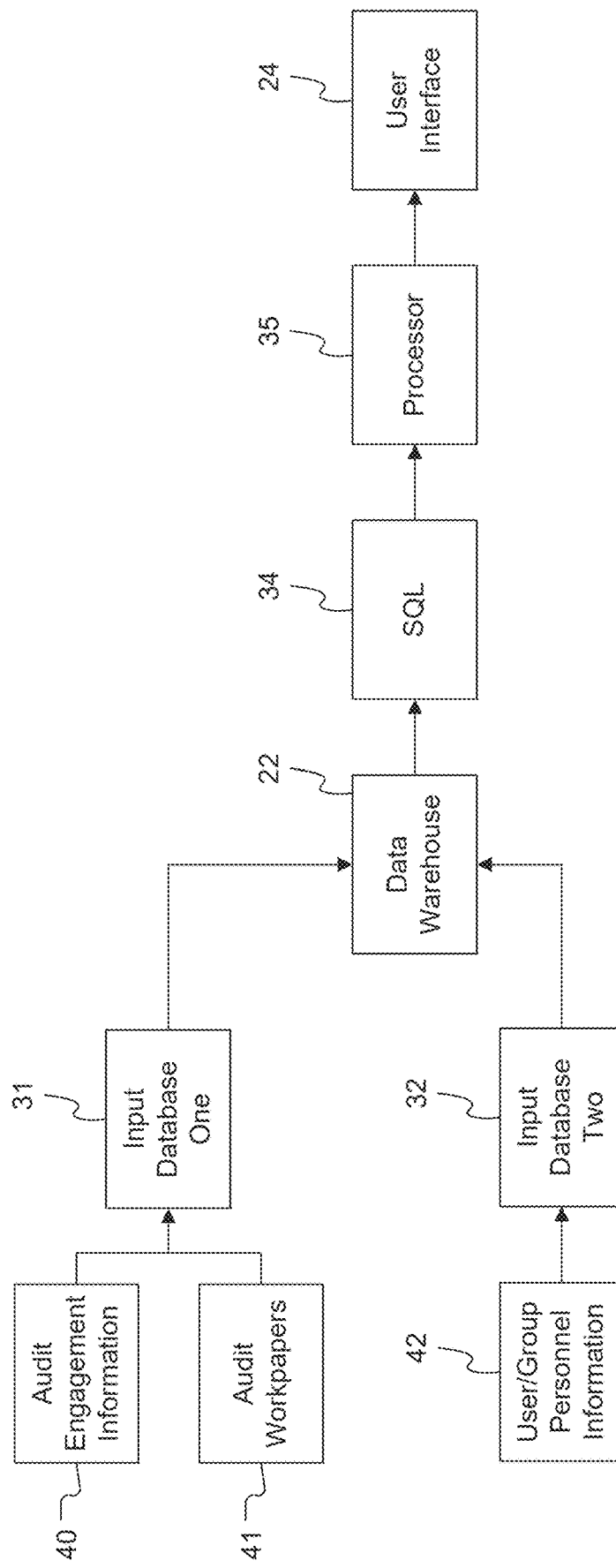
FIG. 4A is a schematic block diagram of various components of the auditing system, consistent with disclosed embodiments.

FIG. 4A is a schematic diagram of the different components of the auditing system, consistent with disclosed embodiments. FIG. 3 illustrates many of the same components, referenced with the same numerals, as shown in FIGS. 2A and 3. In FIG. 4A, the inputs may be in the form of audit engagement information 40, audit workpapers 41 and user/group personnel information 42. Audit workpapers may be audit programs, analyses, memoranda, letters or confirmation and representation, abstracts of company documents, and schedules or commentaries prepared or obtained by an auditor. In the illustrative example of FIG. 4A, the audit engagement information 40 and the audit workpapers 41 may be input into the input database one 31. The user/group personnel information is input into input database two 32.

Figure 4B:
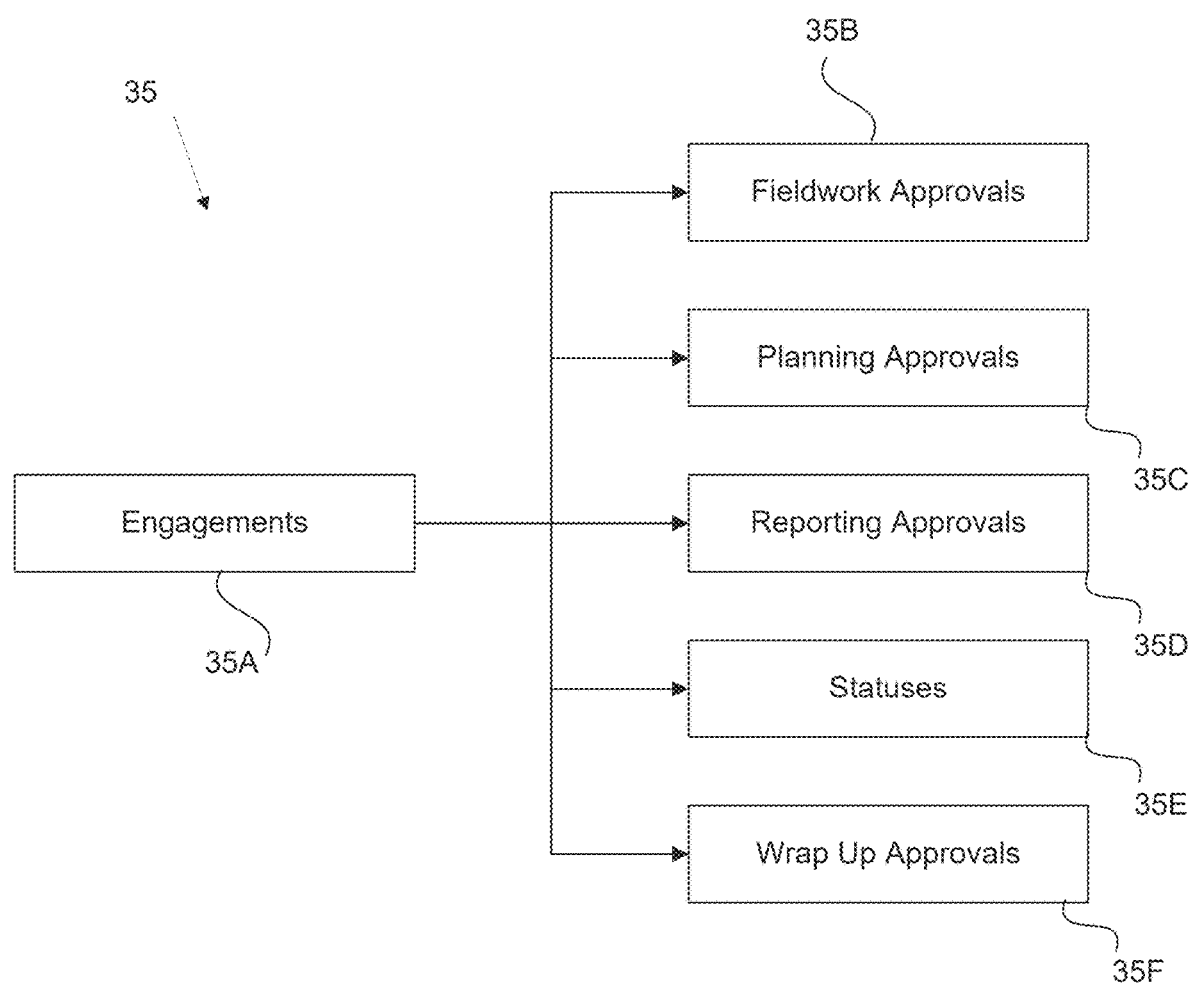
FIG. 4B a schematic diagram of the processor 35, which may be comprised in the processing logic 23, consistent with disclosed embodiments.

FIG. 4B is a schematic diagram of the processor 35, which may be included in the processing logic 23. According to some of the example embodiments, the processor 35 may be configured as a plurality of nodes where each node may be associated with several custom SQL queries used for executing the attribute test(s). A main node may include information related to audit engagements as illustrated in FIG. 4B 'Engagements' 35A. The information included in the main node may be related to an engagement name and code, a lead director and lead assistant general auditor, a project type, a planned start date, a revised start date, a planned report date, a revised report date, and status fields. The engagement information that is featured in the main node of the processor 35 may be filtered via the SQL query to only include engagements that are part of an audit under evaluation by the auditing system.

As illustrated in FIG. 4B, joined to the main 'Engagement' node 35A may be a number of sub-nodes, whereby each sub-node represents a different phase of the engagement, for example, 'Fieldwork Approvals' 35B, 'Planning Approvals' 35C, 'Reporting Approvals' 35D, 'Wrap Up Approvals' 35E, and 'Statuses' 35F. 'Fieldwork Approvals' 35B, 'Planning Approvals' 35C, 'Reporting Approvals' 35D, and 'Wrap Up Approvals' 35F may related to whether approvals have been received during the different phases of the engagement. 'Statuses' 35E may refer to a current status, of a status at a given time, of a respective engagement. It should be appreciated the nodes of FIG. 4B are provided as an example. A processor may include any number of nodes dedicated to any phase of an auditing process. Each sub-node may utilize a custom SQL code, for example, Common Table Expressions (CTEs) and unions to create temporary tables to further organize the data within each node for efficient processing to be performed via the SQL query. A CTE is a result of a query that exists temporarily and for use within the context of a larger query.

Examples of CTE definitions that may be employed are (1) Procedures, which pulls all procedure objects from engagements in the audit plan with defined procedure categories based on requirements for the test performed; (2) Max Approvals, which pulls the last approval date for each procedure object from Procedures where the current status of the object is a required status according to the test performed; (3) Engagement Info, which pulls basic information of all engagements in the current audit plan and excludes certain project types not related to the test performed or any engagements marked for deletion; and (4) Personnel Input Database, which pulls basic department information of audit employees and additionally creates a numeric scale mapping different career levels. An example status that may accompany a test performed is 'In Progress', 'Ready for Review', and 'Reviewed-Approved'. These statuses may be listed in the sequence from which they occur with 'Reviewed-Approved' being the final state of an evaluation.

Once the CTEs are defined, the CTEs are queried in sections to run the logic for each attribute based on the type of test being performed. Each test related to the phase of the audit is tested within an associated node. For example, in the 'Fieldwork Approvals' node there may be three tests performed: AF1, AF3 and AF4. AF1 relates to risk and control, where Control Effectiveness Testing (CET) and Standard Audit Program (SAP) objects may be approved by the Audit Manager or higher. AF3 relates to control, where CET and SAP objects may be reviewed in a timely manner. AF4 relates to Fieldwork procedure objects, where control objects are fully approved at or before the time of approval by a Lead Director. It should be appreciated, the attributes and tests applied to the data may be reconfigurable and application specific. According to some of the example embodiments, the applied logic may be adaptable depending on the test being applied using, for example, CASE WHEN programming statements.

FIG. 4C is an illustrative example use of CASE WHEN programming statements that may be utilized for the applied logic implemented by the processor 35. FIG. 4C depicts a sample of one object tested in AF1 where results are passed to the processor 35. First, a Risk Object under evaluation is defined 45. Specifically, the programming logic is used to retrieve information related to the Risk Object, such as action history, historical date, historical file name, etc. The corresponding resource name and title of an associated auditor is also obtained from the Input databases 47.

The boxed portion of FIG. 4C is where the logic takes place. The first line returns 'N/A' as the result if one of the engagement types that aren't part of the test are present. Specifically, if a project type, associated with a current evaluation, is not indicated as being a 'Standard Audit', a 'Targeted Audit', a 'Project Audit', a 'Consultative Service', a 'Regulatory Issue Validation', a 'Continuous Monitoring', or a 'Special Project', the result of the attribute test is N/A. If the Risk object does not exist, then logic returns a result of 'No test performed'. If the career level of the object is three or greater than the result is 'Pass' and if it is less than three, then 'Audit Manager Approval or Higher Needed' is the result, thereby signaling an auditor with an appropriate access level is needed for reviewing the attribute test in question.

FIG. 5 is a schematic diagram of the interactive interface of the auditing system, consistent with disclosed embodiments. According to some of the example embodiments, the processor uses the output from the SQL queries and calculations to drive the visual content that is provided for the user. In the example provided by FIG. 5, Section 'A' of the interface features audit team and engagement filters. The filters may be used to filter down specific engagement(s) level of detail based on various parameters. For example, under the sections 'Lead AGA' and 'Lead Director', a lead AGA and lead director, respectively, may be assigned within an audit engagement profile tab. Under the dropdown menu labeled 'Project Type' the project type associated with the audit may be defined. Under the dropdown menu labeled 'Engagement Status' an engagement status may be assigned. The start date of processes being audited may be defined under the dropdown menu 'Start Date' and engagements which have not been started may be excluded from the audit under the 'Exclude Not Started' selection.

Under Section 'B' of the user interface, a custom view menu may be utilized to allow a user to save one or more custom views according to an audit analysis a particular user may want to execute. For example, a particular user may only run audit analysis for a particular project type under a particular lead direction, and thus these drop-down menus may be set beforehand via the custom view. Such customization may reduce the need to manually adjust filters whenever the auditing tool is opened. Under Section 'C', the selected audit engagements and the status of each engagement is displayed. Under Section 'D', a test category of the audit engagement phase may be selected to display the monitoring tool's tests for the selected phase. This selection may determine the results reported or displayed in the interface. According to some of the example embodiments, the filter values may be based on the fields and output generated by the SQL queries. Meanwhile, the phase selector may be provided using string values that drive various calculations within the processor. The phase selector may act as a variable that may be replaced with a specific string value within the calculations.

Under Section 'E', the monitoring results of the audit are displayed. The results of each test performed by the tool are categorized into each of the columns, 'Alerts', 'Exceptions', 'Pass', 'No Approvals', and 'No Object'. An 'Alert' is an identification that a quality monitoring test is not currently satisfied for one or more objects and may be cured before becoming an exception. Thus, the 'Alert' provides a notification of a potential exception in the audit before the exception is formally recorded. Therefore, the user or auditor will have an opportunity to perform further research and amend the audit if required.

An 'Exception' is an indication that the quality monitoring test has failed for one or more objects. A 'Pass' is an indication that the quality monitoring test has passed for one or more objects. A 'No Approval' is an indication that a input database object identified in the quality monitoring test has not yet been approved. If a 'No Approval' indication is provided, the user has an opportunity to perform further research and amend the audit as required. As an example, consider an indication of 'No Approval' during a test related to an evaluation of whether a Lead Assistant General Auditor (AGA) has marked a final engagement scope and memo procedure object with a 'Reviewed-Approved' status. If this object exists and does not contain the status 'Review-Approved', the test will return a 'No Approval' designation until the object is approved. If the audit team completes this approval prior to moving to the next phase of the evaluation (e.g., from the 'Engagement Planning and Scoping' phase to the 'Fieldwork' phase), an exception will be avoided and the status of the test till move from 'No Approval' to 'Pass'. The exception will thus not be formally recorded because the test has passed.

A 'No Object' is an indication the input database object assessed within the quality monitoring test is not presented within the engagement, and therefore the indication provides the user with an opportunity to make further amendments if necessary. An 'Exception' indication results in a fail notification logged into the system.

FIG. 6 is a schematic diagram of the interactive interface of the auditing system, consistent with disclosed embodiments. Specifically, FIG. 6 illustrates a hover menu option where a user may hover over a 'Pass' indication (Section 'E' of FIG. 5) for a specific engagement listed in Section 'C'. As shown in FIG. 6, an indication of each test, the test description, an object category, object title, object status, date of approval, approver name, and an approver title is provided in the hover menu. Thus, the interactive interface provides information of the results of the audit analysis. It should be appreciated similar hover menu options may be provided for the different columns under Section 'E'. It should be appreciated the illustration of FIG. 6 is merely an example and the interactive display may provide other forms of information related to an audit under review.

Figure 7:
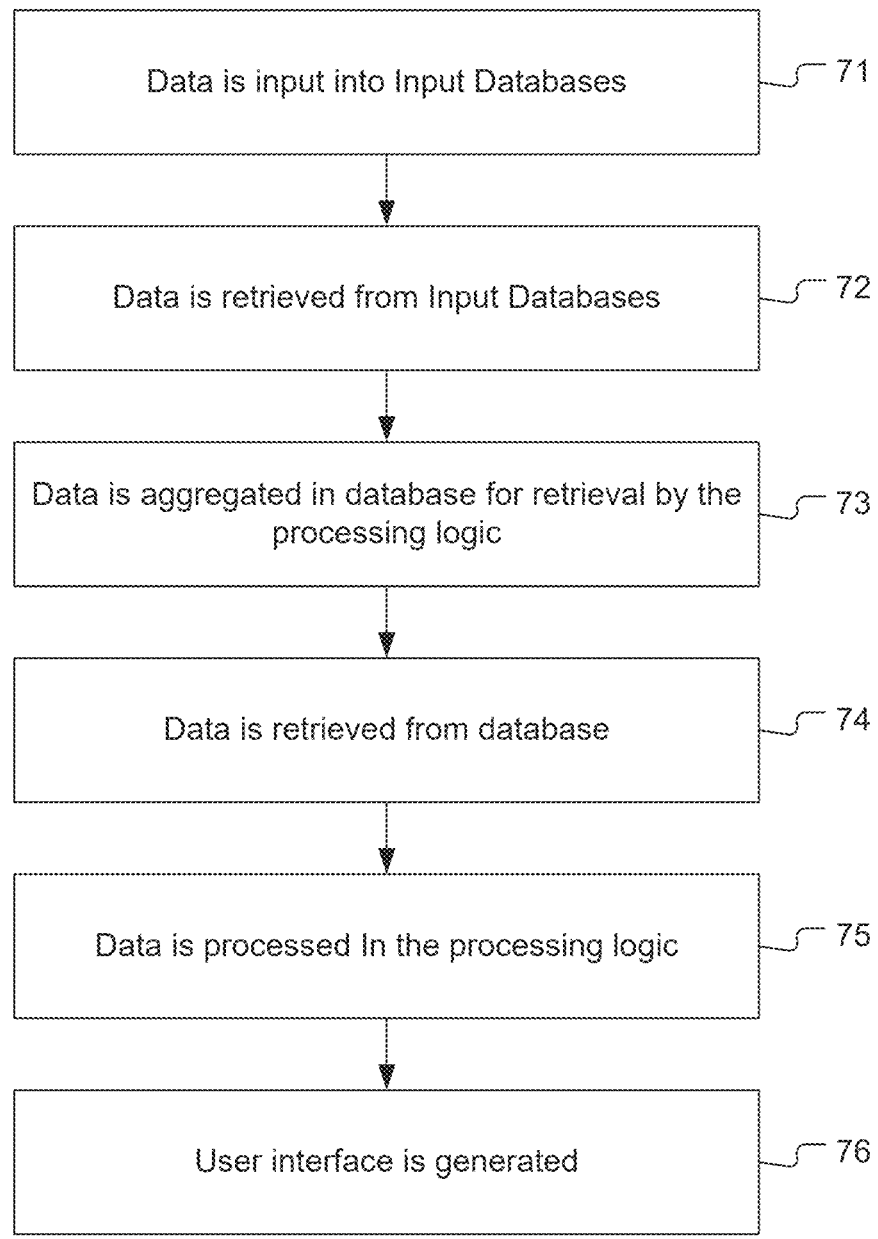
FIG. 7 is a flowchart of exemplary operations of an auditing system, consistent with disclosed embodiments.

FIG. 7 is a flow chart of example operations that may be taken by the audit systems illustrated in any of FIGS. 2A-6, consistent with disclosed embodiments. First, data may be input into input databases 21 (71). The data may be audit-specific data and user/group-personnel-based data. Specifically, the data may include audit engagement information featuring audit engagement records, user information, system history logs, user employment status, reporting hierarchy, or user and group personnel information. Any number of input databases may be employed. According to some examples embodiments, different input databases may be dedicated to specific forms of data, as illustrated in the example provided in FIG. 4A.

Thereafter, a subset of the audit engagement information may be identified so that the subset includes data related to an audit to be processed. The identified subset data may be received from the input databases 21 (72) and aggregated into a data warehouse (e.g., an audit database) 22. In the data warehouse 22, the identified subset of data is arranged and collated for efficient processing and retrieval by a processing logic 23 (73). Such arrangement and collation is described in connection to at least FIGS. 2B-2D.

Once the identified subset data is arranged and collated in the data warehouse 22, the data is retrieved from the data warehouse (74) and the data is thereafter processed in the processing logic (75). The processing performed by the processing logic involves the application of a set of logic in the form of at least one attribute test. According to some of the example embodiments, the processing logic includes a SQL query to perform the at least one attribute test, as described in relation to at least FIGS. 2D, 4B and 4C.

Once a result of the at least one attribute test is received, an interactive user interface 24 (76) is generated where a user may be alerted of possible exceptions and data anomalies before such exceptions are officially recorded. Thus, the interactive interface allows for the user to make corrections in real-time in the input database. The indication to the user may be provided in the form of a generated alert of the potential audit exception or data anomaly. Thereby allowing for receiving a user input to modify the data or the at least one attribute in response to the alert. Examples of the user interface are provided and described in relation to at least FIGS. 5 and 6.

Those skilled in the art should understand that the embodiments of the present disclosure can be provided as a method, a system, or a computer program product. Accordingly, the present disclosure can take the form of an entirely hardware embodiment, an entirely software embodiment, or some embodiments combining software and hardware. Moreover, the embodiments of the present disclosure can take the form of a computer program product implemented on one or more computer usable storage media (including, but not limited to, disk memories, CD-ROMs, optical memories, etc.) comprising computer usable program codes.

The present disclosure is described with reference to the flowcharts and/or the block diagrams of a method, a device (system), and a computer program product according to the embodiments of the present disclosure. It should be understood that each process and/or block in the flowcharts and/or block diagrams, as well as combinations of the processes and/or blocks in the flowcharts and/or the block diagrams, can be implemented by computer program instructions.

These computer program instructions can be provided to a processor of a computer, an embedded processor, or other programmable data processing devices to produce a machine such that an apparatus for implementing the functions specified in one or more processes in the flowcharts and/or one or more blocks in the block diagrams can be produced by instructions executed by the processor of the computer or other programmable data processing devices.

These computer program instructions can also be stored in a computer readable memory that can direct a computer or other programmable data processing devices to function in a particular manner such that the instructions stored in the computer readable memory produce an article of manufacture including an instruction means which implements functions specified in one or more processes in the flowcharts and/or one or more blocks in the block diagrams.

These computer program instructions can also be loaded onto a computer or other programmable data processing devices so that a series of operating steps are performed on the computer or other programmable devices to produce computer-implemented processing. Thus the instructions executed on a computer or other programmable devices provide steps for implementing the functions specified in one or more processes in the flowcharts and/or one or more blocks in the block diagrams.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed:

1. A method for auditing, the method comprising:
   receiving engagement information into a plurality of input databases;
   identifying a subset of the engagement information and extracting the subset into a data warehouse, wherein the subset is associated with an audit to be processed;
   extracting and collating the subset via a processing logic unit resulting in a processed subset;
   applying at least one attribute to the processed subset; and
   generating a report of the applied at least one attribute on the processed subset and an alert of a potential exception prior to a recording of the potential exception;
   wherein the extracting comprises identifying data associated with the processed subset based on an object type associated with the data;
   the collating comprises renaming the data to account for any variance and to provide consistency to the audit process; and
   the at least one attribute depends on an attribute test applied to the processed subset, the attribute test designed to assess whether a project or process under review in the audit meets predefined standards.

2. The method of claim 1, wherein engagement information includes engagement records, user information, system history logs, user status, reporting hierarchy, user personnel information, and group personnel information.

3. The method of claim 1, wherein the processing logic unit includes a Structured Query Language (SQL) database.

4. The method of claim 1, wherein the extracting and collating further includes organizing the engagement information for processing.

5. The method of claim 1, further comprising receiving a user input to modify the at least one attribute.

6. The method of claim 1, wherein the at least one attribute determines if: a user associated with a specific audit query has a sufficient level of authority; a review date for the audit is past an acceptable date for review; or an action item associated with the audit comprises a threshold date indicating an analysis or an object review in a timely manner.

7. The method of claim 1, wherein the object type includes at least one of risk, control procedures, or supporting documents.

8. A system for auditing, the system comprising:
   at least one input database configured to receive engagement information;
   a data warehouse configured to extract and collate a subset of the received engagement information, wherein the subset is associated with an audit to be processed;
   a processing logic that extracts and collates the subset resulting in a processed subset;
   a processor configured to apply at least one attribute to the processed data; and
   the processor further configured to generate a user interface providing a report of the applied at least one attribute on the processed subset and an alert of a potential exception prior to a recording of the potential exception;
   wherein the extracting comprises identifying data associated with the processed subset based on an object type associated with the data;
   the collating comprises renaming the data to account for any variance and to provide consistency to the audit process; and
   the at least one attribute depends on an attribute test applied to the processed subset, the attribute test designed to assess whether a project or process under review in the audit meets predefined standards.

9. The system of claim 8, wherein engagement information includes engagement records, user information, system history logs, user status, reporting hierarchy, user personnel information, and group personnel information.

10. The system of claim 8, wherein the processing logic includes a Structured Query Language (SQL) database.

11. The system of claim 8, wherein the data warehouse is further configured to organize the engagement information for processing.

12. The system of claim 8, wherein the processor is further configured to receive a user input to modify the at least one attribute.

13. The system of claim 8, wherein the at least one attribute determines if: a user associated with a specific audit query has a sufficient level of authority; a review date for the audit is past an acceptable date for review; or an action item associated with the audit comprises a threshold date indicating an analysis or an object review in a timely manner.

14. The system of claim 8, wherein the object type includes at least one of risk, control procedures, or supporting documents.

15. A non-transitory computer-readable medium storing an auditing program including instructions that, when executed by a processor, causes an audit system to:
   receive engagement information into a plurality of input databases;
   identify a subset of the engagement information and extract the subset into a data warehouse, wherein the subset is associated with an audit to be processed;
   extract and collate the subset via a processing logic unit resulting in a processed subset;
   apply at least one attribute to the processed subset; and generate a report of the applied at least one attribute on the processed subset and an alert of a potential exception prior to a recording of the potential exception;

wherein the extract comprises identifying data associated with the processed subset based on an object type associated with the data;

the collate comprises renaming the data to account for any variance and to provide consistency to the audit process; and the at least one attribute depends on an attribute test applied to the processed subset, the attribute test designed to assess whether a project or process under review in the audit meets predefined standards.

16. The non-transitory computer-readable medium of claim 15, wherein engagement information includes engagement records, user information, system history logs, user status, reporting hierarchy, user personnel information, and group personnel information.

17. The non-transitory computer-readable medium of claim 15, wherein the processing logic unit includes a Structured Query Language (SQL) database.

18. The non-transitory computer-readable medium of claim 15, wherein the audit system is further configured to extract and collate via an organization of the engagement information for processing.

19. The non-transitory computer-readable medium of claim 15, wherein the audit system is further configured to receive a user input to modify the at least one attribute.

20. The computer-readable medium of claim 15, wherein the at least one attribute determines if: a user associated with a specific audit query has a sufficient level of authority; a review date for the audit is past an acceptable date for review; or an action item associated with the audit comprises a threshold date indicating an analysis or an object review in a timely manner.

* * * * *